United States Patent

[11] 3,548,085

[72] Inventor Satoshi Shimada
Tokyo, Japan

[21] Appl. No. 712,530
[22] Filed March 12, 1968
[45] Patented Dec. 15, 1970
[73] Assignee Sony Corporation
Tokyo, Japan
a corporation of Japan
[32] Priority March 13, 1967
[33] Japan
[31] No. 42/15685

[54] COLOR TELEVISION TRANSMISSION SYSTEMS FOR ELIMINATION OF CROSS MODULATION
6 Claims, 7 Drawing Figs.

[52] U.S. Cl. .......... 178/5.4, 178/5.8
[51] Int. Cl. .......... H04n 5/62, H04n 5/40
[50] Field of Search .......... 178/7.1, 5.6, 5.8; 332/40, 48; 179/15ACS, 15; 325/156, 157, 154, 139, 5.8A

[56] References Cited
UNITED STATES PATENTS
3,348,150 10/1967 Atal et al. .......... 325/157

*Primary Examiner*—Robert L. Griffin
*Assistant Examiner*—Donald E. Stout
*Attorneys*—Albert C. Johnston, Robert E. Isner, Lewis H. Eslinger and Alvin Sinderbrand

ABSTRACT: A novel color TV transmitter is provided having at least two modulators for modulating a video carrier with the FM sound signal, modulated chrominance signal, and luminance signal. The outputs of the at least two modulators are combined to make up the composite transmitted signal. In one embodiment, a combined FM sound signal and luminance signal is applied to one modulator, while the modulated chrominance signal is applied to the other modulator. In a further embodiment, the FM sound signal is applied to one modulator, and a combined luminance signal and modulated chrominance signal is applied to the other modulator. In certain embodiments, the outputs from the at least two modulators are combined in an adder circuit, while in others they are combined in a differential circuit. Still further embodiments are shown. The system of the transmitter avoids beat noise, cross talk, and intermodulation.

INVENTOR.
Satoshi Shimada

BY ATTORNEYS

INVENTOR.
Satoshi Shimada

BY

ATTORNEYS

INVENTOR.

Satoshi Shimada

BY

ATTORNEYS

INVENTOR.
Satoshi Shimada
BY
ATTORNEYS

COLOR TELEVISION TRANSMISSION SYSTEMS FOR ELIMINATION OF CROSS MODULATION

This invention relates to a new and improved transmitter system for use in color television, and more particularly to a simplified but stable transmitter for a plurality of information signals including a subcarrier signal.

In color television of, for example, the NTSC system, the difference in frequency between a sound carrier wave $f_s$ and picture carrier wave $f_p$ must be held constantly and precisely at 4.5 MHz. For this purpose, conventional types of transmitters specially employ an oscillator such, for example, as a stable but expensive crystal oscillator of 4.5 MHz., which effects the so-called frequency control for maintaining the frequency difference exactly at 4.5 MHz. This introduces drawbacks such as complexity in construction and expensiveness in the manufacture of transmitters and further intermodulation of a sound modulation carrier and another modulation carrier leads to generation of beat noises. As a result of this, crosstalk is caused and the beat noises are likely to be reproduced in a monitoring picture.

Accordingly, it is a principal object of this invention to provide a new and improved transmission system for color television signals or the like.

It is a further object of this invention to provide a new and improved transmitter for a plurality of modulation signals.

It is another object of this invention to provide a new and improved transmission system for color television signals which have no beat noises between modulated signals.

It is another object of this invention to provide a new and improved transmitter in which a modulation index of input signals may be increased easily.

The features of the present invention which are believed to be novel are set forth with particularity in the appended claims. The organization and manner of operation of this invention, together with further objects and advantages thereof, may best be understood by reference to the following description taken in connection with the accompanying drawings, in which:

Figure 1:
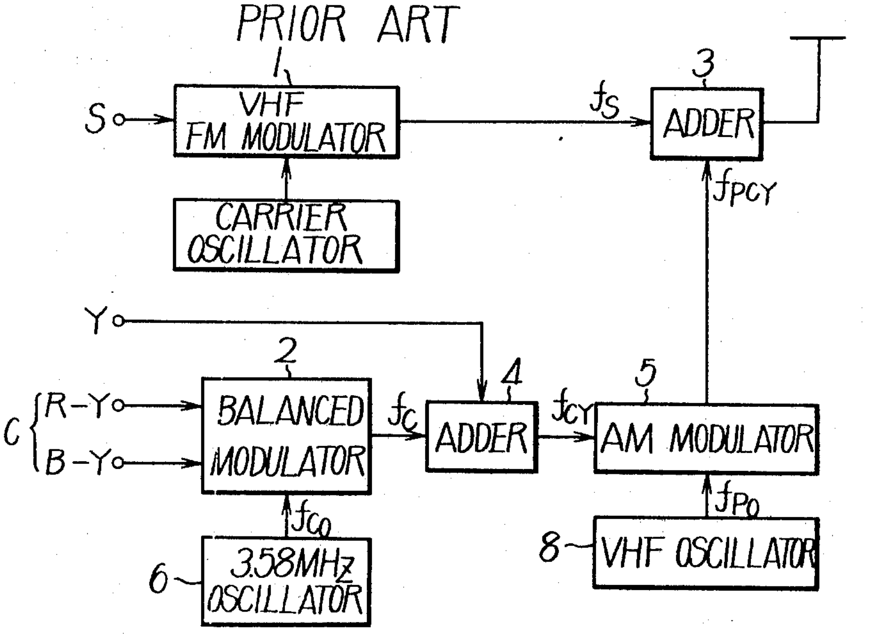
Fig. 1 PRIOR ART
FIGS. 1 and 2 are block diagrams illustrating examples of a conventional transmission system for color television signals.

In FIG. 1 there is illustrated in block form one example of the prior art color television signal transmitter. The transmitter comprises a source of a sound signal S and a frequency modulator 1 in which a carrier frequency $f_{so}$ is modulated by the sound signal. Further, the transmitter includes sources of a luminance signal Y, a chrominance signal C and a balanced modulator 2 in which a subcarrier frequency $f_{co}$ of 3.58 MHz. produced by, for example, a crystal oscillator 6 is modulated by the chrominance signal C.

The chrominance signal C includes color difference signals, for example, red and blue difference signals R-Y and B-Y, which are respectively applied to the balanced modulator 2. The luminance signal Y and a subcarrier $f_c$ modulated by the balanced modulator 2 are supplied to an adder 4 respectively. The output $f_{cy}$ of the adder 4 is applied to an amplitude modulator 5 to which a carrier wave $f_{po}$ of VHF frequency is also fed from an oscillator 8. The output $f_s$ of the frequency modulator and the output $f_{pcy}$ of the amplitude modulator 5 are respectively applied to an adder 3, the output signals of which are transmitted and radiated by an antenna. With the prior art transmitter it is necessary to hold exactly the frequency difference between $f_{so}$ and $f_{po}$ at 4.5 MHz.

Figure 2:
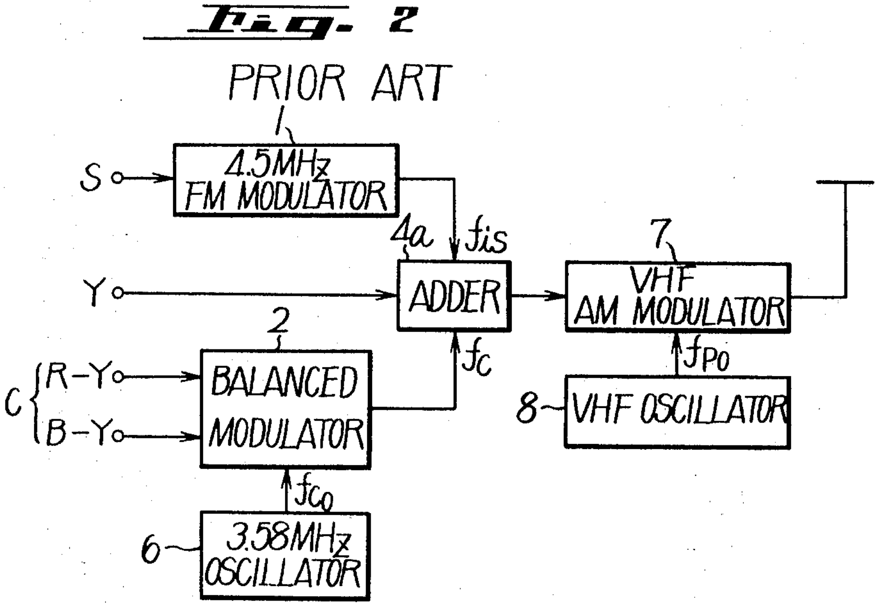
Fig. 2 PRIOR ART

FIG. 2 shows another example of the prior art transmitter, in which a modulated sound signal $f_{is}$ having a center frequency of 4.5 MHz., a luminance signal Y and a chrominance signal $f_c$ modulated by a balanced modulator 2 are applied together to an adder 4a, the output of which is, in turn, fed to a final amplitude modulator 7. Reference numerals similar to those in FIG. 1 indicate similar elements and the operation of this transmitter is the same as that of the above example. Hence, no detailed description will be repeated. In the transmitter of FIG. 2, both the sound signal and chrominance signal are modulated in the final amplitude modulator 7, and therefore beat noise is likely to occur due to frequency difference of 920 kHz. present between $f_{is}$ and $f_{co}$. Consequently, during receiving the signal, the so-called crosstalk may be caused and beat noises are displayed in a monitoring picture.

FIGS. 3 to 6 illustrate examples of a novel and improved transmitter according to this invention which is free from the drawbacks described above. In the following examples of this invention similar elements are identified by similar reference numerals.

Figure 3:
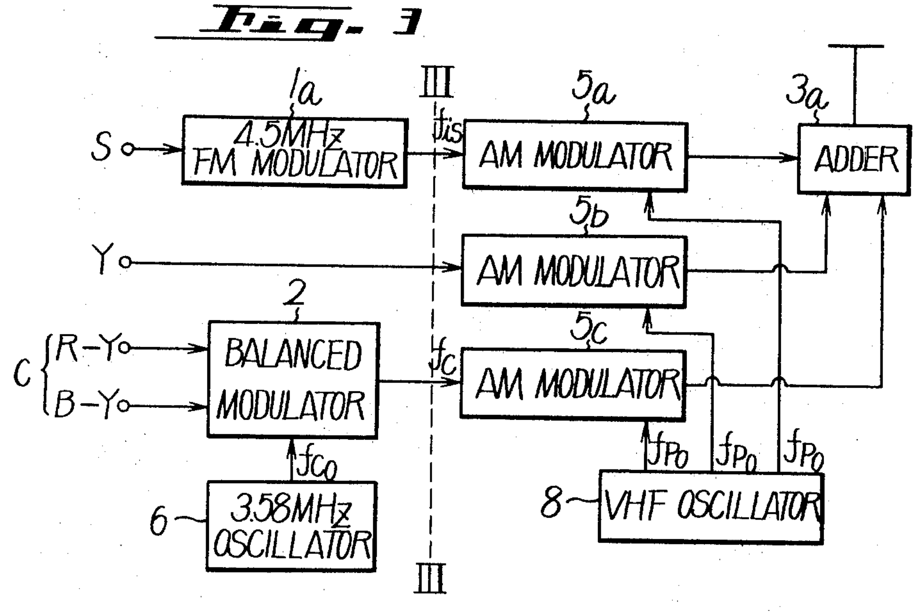
FIG. 3 is a block diagram, for explaining a transmission system for color television signals according to this invention.

The transmitter exemplified in FIG. 3 comprises a plurality of modulators 5a, 5b and 5c to which a common carrier wave $f_{po}$ is applied respectively from a single oscillator 8. A sound signal S modulated by a frequency modulator 1a, a luminance signal Y and a chrominance signal $f_c$ modulated by a balanced modulator 2, which are the same as those described with FIGS. 1 and 2, are respectively fed to the amplitude modulators 5a, 5b and 5c. The outputs of the modulators 5a, 5b and 5c are applied together to an adder 3a and the resultant signal are radiated through an antenna. This invention does not cause intermodulation, because the sound signal S and the subcarrier chrominance signal $f_c$ are applied to the modulators 5a and 5c independently of each other. This ensures avoidance of beat noise generation and/or crosstalk. Further, slight variations of the carrier wave $f_{po}$ are permissible, because the frequency difference of 4.5 MHz. is constantly maintained by the modulator 1a. This permits simplification of the transmitter and reduction of the cost thereof.

Figure 4:
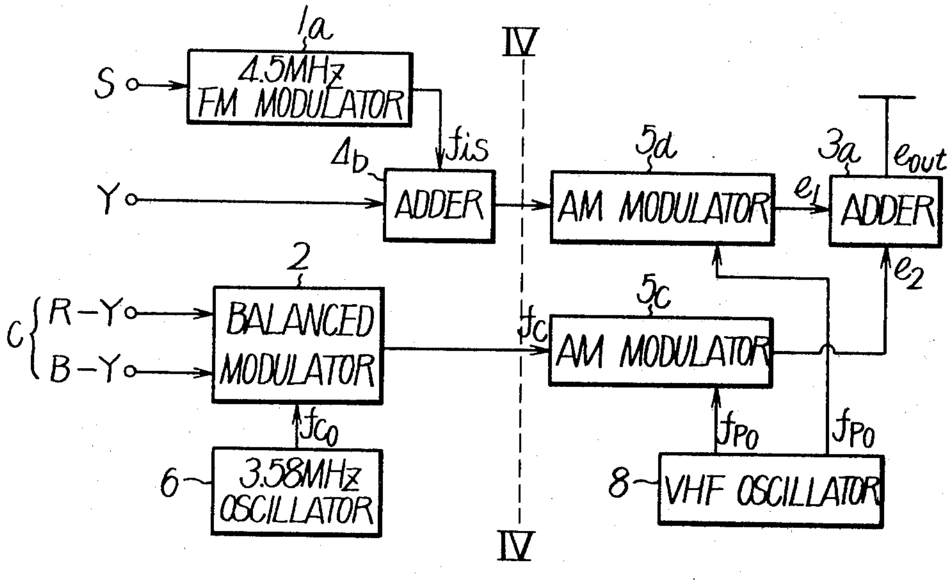
FIGS. 4 to 6 are similar block diagrams showing other modified forms of this invention.

FIG. 4 shows another example of the transmitter according to this invention, in which the modulated sound signal $f_{is}$ is combined with the luminance signal Y at the adder 4b. The output of the adder 4b and modulated chrominance signal $f_c$ modulated at the balanced modulator 2 are respectively applied to the amplitude modulators 5d and 5c. The circuit arrangement on the right of the broken line IV–IV in the FIG. is identical with that on the right of the line III–III in FIG. 3.

Figure 5:
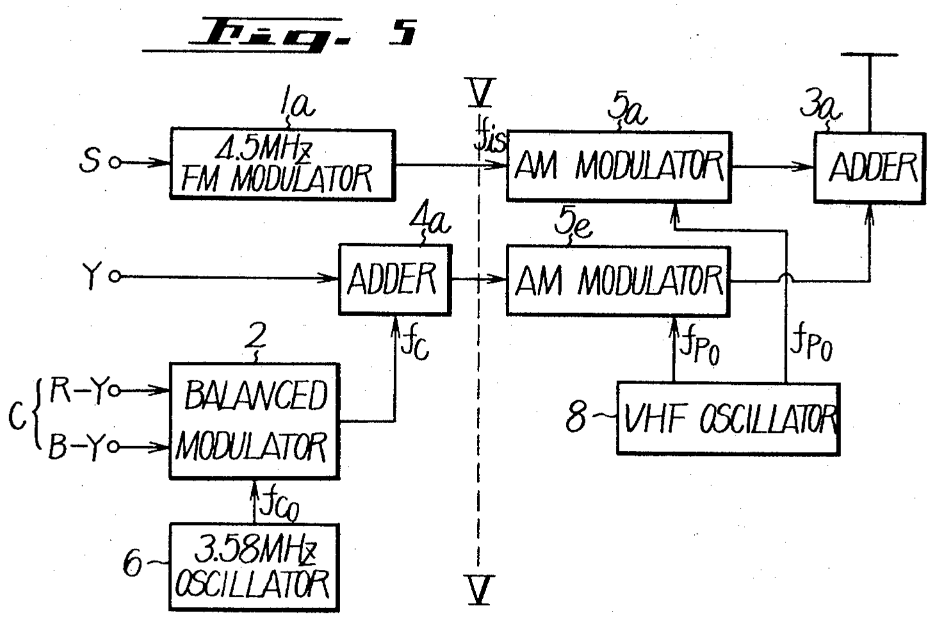

FIG. 5 illustrates a further example of this invention, which is identical with those exemplified in FIGS. 3 and 4 except in that the luminance signal Y and the modulated chrominance signal $f_c$ are fed together to an adder 4a.

In the example depicted in FIG. 4 the output signals $e_1$ and $e_2$ of the amplitude modulators 5d and 5c are added together by the adder 3a in the form of its output $e_{out}$. The equation of this operation is given as follows:

$$e_1=A\{1+Y(t)S(t)\}\sin(\omega pt)$$

$$e_2=B\{1+C(t)\}\sin(\omega pt)$$

$$e_{out}=e_1+e_2=(A+B)\left\{1+\frac{A}{A+B}\cdot Y(t)+\frac{A}{A+B}\cdot C(t)+\frac{A}{A+B}\cdot S(t)\right\}\sin(\omega pt)$$

where A and B are constants, $Y(t)$ a luminance signal component, $C(t)$ a chrominance signal component, $S(t)$ a sound signal component and $\omega p$ a phase angle of the carrier wave. It must be noted that the modulation indexes of the luminance signal and the sound signal and that of the chrominance signal are reduced to $\frac{A}{A+B}$ and $\frac{B}{A+B}$ respectively, as is apparent from the above equation.

Figure 6:
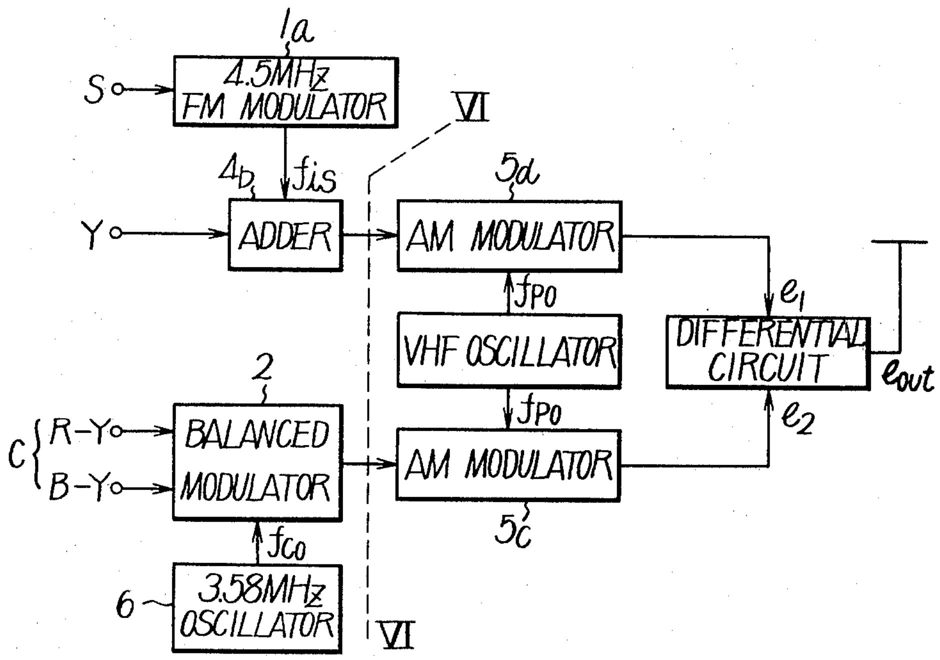

In FIG. 6 there is illustrated still a further modified form of this invention, which is exactly the same as that shown in FIG. 3 with the exception of the differential circuit 3b. the Output $e_{out}$ of the differential circuit 3b is similarly given by the following equation.

$$e_{out}=e_1+e_2=(A-B)\left\{1+\frac{A}{A-B}\cdot Y(t)-\frac{B}{A-B}\cdot C(t)+\frac{A}{A-B}\cdot S(t)\right\}\sin(\omega pt)$$

It appears from the above equation that the modulation indexes of the luminance signal, the chrominance signal and the sound signal are respectively enhanced up to $\frac{A}{A-B}$, $\frac{B}{A-B}$ and $\frac{A}{A-B}$. In this case the polarity of the chrominance signal component is inverted as indicated by −B**C(*b*8and this indicates a 180° phase shift of the subcarrier of the color subcarrier but is not related to the information content of the chrominance signal. A circuit for providing the 180° phase shift may be included either in the balance modulator such as by adding a phase shifting transformer or a transistor amplifier of the common emitter configuration.

The foregoing examples have been described with the main carrier wave of VHF but it may be of UHF.

Figure 7:
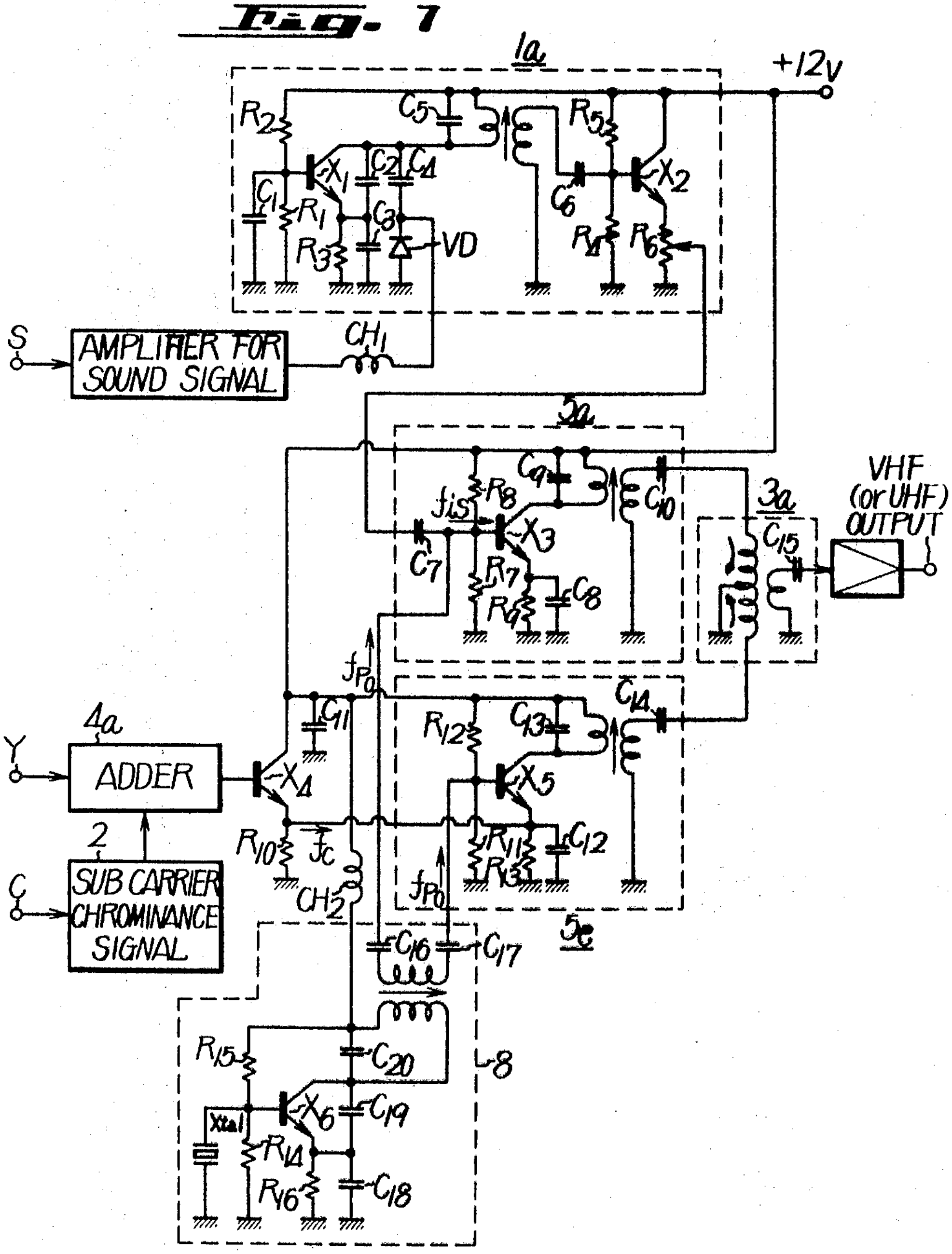
FIG. 7 illustrates circuit connections of the principal circuits of the transmission system exemplified in FIG. 5.

FIG. 7 illustrates concrete circuit connections of the circuits 1*a*, 5*a*, 5*e*, 3*a* and 8 of the transmitter shown in FIG. 5. The operation of the transmitter can be readily understood, and hence the following brief description will be given. The sound signal from "the amplifier for sound signal" is applied through an inductor CH1 to the 4.5 MHZ. FM modulator 1*a* to a common point between a grounded variable capacitor diode, VD and capacitor C4; capacitor VD and C4 are shunt connected with two series connected capacitors C2 and C3. The junction of capacitor C2 and C4 is connected to a tank circuit made up of C5 and one winding of a transformer. This junction point is also connected to a collector of a transistor X1 which has its emitter connected to a common point of capacitor C2 and C3. A resistor R3 is also connected between the emitter and ground. Divider resistors R1 and R2 are serially connected between power source +12v. and ground, and have their common point connected to a base of transistor X1 and through a capacitor C1 to ground. The output of the modulator oscillator is applied through a transformer, one winding of which is in the tank circuit with the capacitor C5. The output signal is applied to an emitter follower amplifier through another winding of the transformer and a capacitor C6 and then to the base of a transistor X2. Two divider resistors R5 and R4 are connected serially between the +12v. source and ground, with a common point at a base of the transistor X2. A collector of the transistor X2 is connected to the +12v. power. A load resistor R6 is connected to an emitter of transistor X2 and to ground; and the output, namely the FM modulated sound signal is tapped off this load resistor R6 and is applied to an Am modulator 5*a*.

The combined luminance and modulated chrominance signal are applied from an adder 4*a* to a second AM modulator 5*e* which is similar to the AM modulator 5*a*.

The second input to both modulators 5*a* and 5*e* is the video signal carrier shown here coming from VHF oscillator 8. The oscillator has a transistor X6 and a crystal frequency source XTAL connected between its base and ground. Divider resistors R14 and R15 are connected between ground and a tuned circuit made up of capacitor C20 and one winding of an output transformer. A common point between the resistors is connected to the transistor's base; and a common point between the tuned circuit's capacitor and winding is connected to a collector of the transistor. A capacitor C19 is connected between a collector and an emitter of transistor X6 and capacitor C18 is connected between the emitter and shunted by a resistor R16. The common point of the tuned circuit and resistor R15 is connected through an inductor CH2 to the +12v. source. Inductance CH2 passes a DC component from the supply to the oscillator and blocks the high frequency signals of the oscillator from passing into the power supply. The output of VHF oscillator 8 is applied through a transformer and capacitors C16 and C17 respectively to modulator 5*a* and modulator 5*e*. It might be noted that the phase of the signal applied to modulator 5*a* is different than the phase of the signal applied to modulator 5*e*. However, in the adder circuit 3*a* to which the signals are subsequently applied, an equal and opposite amount of phase difference is put back into the signals, so that the finally produced output signal has the improper phase relationship.

Referring now to modulator 5*a*, it will be recalled that the output from the FM modulator 1*a* is applied to the modulator 5*a*. Modulator 5*a* consists of a transistor X3, dividing resistors R7 and R8 connected between the source of potential +12v. and ground, with their common point at a base of the transistor X3. Bias-temperature compensation resistor R9 is connected between the emitter and ground, and a pass capacitor C8 is also connected in shunt with the resistor R9. The FM sound signal is applied through a capacitor C7 to the base of the transistor and the VHF oscillations from oscillator 8 is also applied to the base of the transistor. The capacitance of C7 is such that the VHF signal does not pass therethrough; and the capacitor C16 in the output of the VHF oscillator is such that the FM signal is blocked thereby. The combined signals are thus applied to the transistor X3 which modulates and amplifies them and provides the output at its collector. A tuned coupling transformer made up of a transformer and capacitors C9 and C10 passes the output signal from the modulator to the adder 3*a*.

The second AM modulator, 5*e*, receives the input signals from the VHF oscillator 8 and the combined luminance and modulated chrominance signal from the adder 4*a*. The latter signal is applied through an emitter follower amplifier. The emitter follower is made up of a transistor X4 having its base connected to receive the combined signals from adder 4*a*. A load resistor R10 is connected between an emitter of transistor X4 and ground, and a collector is connected to the +12v. source. The output from the emitter follower shown in the drawing as an arrow having a legend $f_c$is applied to the modulator 5*e*.

Modulator 5*e* is made up of a transistor X5 and is biased (in a fashion similar to that of transistor X3 in modulator 5*a*) by divider resistors R12 and R11. Emitter resistor R13 and pass capacitor C12 are connected between an emitter of transistor X5 and ground. The video carrier input is applied from oscillator 8 to a base of transistor X5 and the combined luminance and modulated chrominance signal is applied to the emitter of transistor X5. The input signals are modulated by the transistor and the modulated output is taken from the collector through a tune circuit makeup of transformer and capacitor C13 and C14 and applied to adder circuit 3*a*. Power is provided from the +12v. source, shunted by capacitor c11, to the collector of transistor X5 through one winding of the output transformer and to one terminal of the bias resistor R12.

The outputs from modulator 5*a* and 5*e* are applied to adder circuit 3*a* which is a transformer shown having a split primary winding one half of which receives the output from modulator 5*a* and the other receiving the output from modulator 5*e*. It will be noted that there is a phase reversal of one signal which corresponds to the phase reversal of the output of the VHF signal from oscillator 8. The combined signals appear on a secondary winding of the transformer and is passed through a coupling capacitor C15 to the output. The numerical values of the circuit components in one preferred embodiment of the transmitter are as follows:

Voltage = +12 volts

Capacitors:

| | | |
|---|---|---|
| $C_1$ | μf | 0.01 |
| $C_2$ | pf | 20 |
| $C_3$ | pf | 50 |
| $C_4$ | pf | 50 |
| $C_5$ | pf | 10 |
| $C_6$ | pf | 1,000 |
| $C_7$ | μf | 0.01 |
| $C_8$ | μf | 0.01 |
| $C_9$ | pf | 20 |
| $C_{10}$ | pf | 25 |
| $C_{11}$ | μf | 100 |
| $C_{12}$ | pf | 50 |
| $C_{13}$ | pf | 20 |
| $C_{14}$ | pf | 25 |
| $C_{15}$ | pf | 100 |

| | |
|---|---|
| $C_{16}$ ---- pf -- | 15 |
| $C_{17}$ ---- pf -- | 15 |
| $C_{18}$ ---- pf -- | 10 |
| $C_{19}$ ---- pf -- | 3 |
| $C_{20}$ ---- pf -- | 10 |
| Resistors: | |
| $R_1$ ---- kilo-ohms -- | 6.8 |
| $R_2$ ---- do ---- | 75 |
| $R_3$ ---- do ---- | 1 |
| $R_4$ ---- do ---- | 10 |
| $R_5$ ---- do ---- | 10 |
| $R_6$ ---- do ---- | 2 max. |
| $R_7$ ---- do ---- | 5.1 |
| $R_8$ ---- do ---- | 24 |
| $R_9$ ---- do ---- | 1 |
| $R_{10}$ ---- do ---- | 1 |
| $R_{11}$ ---- do ---- | 5.6 |
| $R_{12}$ ---- do ---- | 20 |
| $R_{13}$ ---- ohms -- | 510 |
| $R_{14}$ ---- kilo-ohms -- | 5.6 |
| $R_{15}$ ---- do ---- | 13 |
| $R_{16}$ ---- do ---- | 1 |
| Inductors: | |
| $CH_1$ ---- μH -- | 100 |
| $CH_2$ ---- μH -- | 100 |
| Transistors: | |
| $X_1$, $X_2$, $X_4$ ---- | 2SC403 |
| $X_3$, $X_5$, $X_6$ ---- | 2SC629 |
| Diode: | |
| VD (variable capacitor) ---- | 1S353 |

It will be apparent that many modifications and variations may be effected without departing from the scope of the novel concepts of this invention.

I claim:

1. A transmitter system for a color video signal comprising:

an FM modulator adapted to receive a sound signal and modulate it on a sound carrier;

a balance modulator adapted to receive color difference signals and modulate them on a chrominance carrier;

a source of video carrier;

a pair of modulators connected to the carrier source, one being connected to the FM modulator and the other being connected to the balanced modulator, for respectively receiving the modulated signals therefrom and modulating the video carrier with the modulated signals;

a combining circuit connected to the pair of modulators for receiving the video carrier modulated signals therefrom and combining said signals to provide a combined output signal;

means for incorporating said luminance signal with the modulated signals so that the output from the combining circuit includes the carrier modulated with the sound, chrominance, and luminance signals.

2. A system according to claim 1 wherein the means for incorporating the luminance signal is still another modulator connected to the carrier source, and adapted to receive the luminance signal, for modulating the video carrier with the luminance signal; and said modulator is connected to the combining circuit wherein the modulated luminance signal is combined with the other signals received by the combining circuit.

3. A system according to claim 1 wherein the means for incorporating the luminance signal is an adder circuit connected between the FM modulator and said one modulator for receiving the FM modulated sound signals from the FM modulator, and for also receiving the luminance signal, and combining said signals and providing the combined signal to said one modulator.

4. A system according to claim 1 wherein said means for incorporating the luminance signal includes an adder circuit connected between the balanced modulator and the other modulator for receiving the modulated chrominance signal and the luminance signal and combining the received signals and providing the combined signals to said other modulator.

5. A system according to claim 3 wherein the combining circuit is an adder circuit, and the output therefrom has the form:

$$(A+B)1+\frac{A}{A+B}\cdot Y(t)+\frac{A}{A+B}\cdot C(t)+\frac{A}{A+B}\cdot S(t)\sin(wpt)$$

wherein A and B are constants $Y(t)$ is the luminance signal, $C(t)$ is the chrominance signal, $S(t)$ is the sound signal, and WP is a phase angle.

6. A system according to claim 3 wherein the combining circuit has a differential circuit and the output therefrom is the form:

$$A-B1+\frac{A}{A-B}\cdot Y(t)-\frac{B}{A-B}\cdot C(t)+\frac{A}{A-B}\cdot S(t)\sin(wpt)$$

wherein A and B are constants $Y(t)$ is the luminance signal, $C(t)$ is the chrominance signal, S(t) is the sound signal, and WP is a phase angle.